(12) United States Patent
Bolnick et al.

(10) Patent No.: US 6,357,593 B1
(45) Date of Patent: Mar. 19, 2002

(54) BLISTER CARD LABEL FORM

(76) Inventors: Martin M. Bolnick, 7161 Woodbridge Cir., Boca Raton, FL (US) 33434; Richard S. Bolnick, 150 Round Hill Rd., Roslyn Heights, NY (US) 11577

( * ) Notice: Subject to any disclaimer, the term of this patent is extended or adjusted under 35 U.S.C. 154(b) by 0 days.

(21) Appl. No.: 09/691,434

(22) Filed: Oct. 18, 2000

(51) Int. Cl.⁷ .......................... B32B 33/00; B65D 83/04
(52) U.S. Cl. .................. 206/531; 40/638; 206/534; 428/41.8; 428/41.9; 428/42.3
(58) Field of Search .................. 40/638, 630; 206/232, 206/459.5, 461, 469, 528, 534, 538, 539, 531; 428/40.1, 41.7, 41.8, 42.2, 42.3; 53/411

(56) References Cited

U.S. PATENT DOCUMENTS

| | | | | |
|---|---|---|---|---|
| 4,211,329 A | * | 7/1980 | Braverman | 206/534 |
| 4,248,919 A | * | 2/1981 | Davis | 428/40.1 |
| 5,014,851 A | * | 5/1991 | Wick | 206/531 |
| 5,078,427 A | * | 1/1992 | Ishii et al. | 428/41.8 |
| 5,290,616 A | * | 3/1994 | Cowan et al. | 428/41.8 |
| 5,613,349 A | * | 3/1997 | Brown | 53/411 |
| 5,766,716 A | * | 6/1998 | Barry | 428/40.1 |
| 6,027,598 A | * | 2/2000 | Anderson | 40/630 |
| 6,027,780 A | * | 2/2000 | Treleaven et al. | 428/40.1 |
| 6,037,029 A | * | 3/2000 | Instance | 428/40.1 |

* cited by examiner

Primary Examiner—Jim Foster
(74) Attorney, Agent, or Firm—Kenyon & Kenyon

(57) ABSTRACT

A blister card label form has a first sheet and a second sheet each having first and second major surfaces. The first sheet is provided with removable portions and a permanent adhesive on its second major surface. The second sheet is provided with a temporary adhesive on its second major surface. The second sheet is smaller than the first sheet and is superimposed on the first sheet so that the first major surface of the second sheet is attached to the permanent adhesive on the second surface of the first sheet with a portion of the permanent adhesive of the first sheet surrounding the second sheet.

32 Claims, 6 Drawing Sheets

BLISTER CARD LABEL FORM

FIELD OF THE INVENTION

The present invention relates to label forms for blister cards and more particularly to label forms for blister cards that are child resistant and senior friendly.

BACKGROUND

Conventional blister cards often utilize a retaining label, such as paper, or foil, to retain a medicament in the medicament compartment or "blister" of a blister card. When the user wishes to use the medicament, the medicament is pushed through the retaining label. One shortcoming of this conventional blister card packaging is that a child may tamper with the package and release the medicament. One approach to making conventional blister cards resistant to tampering by children is to increase the thickness of the label so that more strength is required to push the medicament through the sheet. Another approach is to vary the composition of the material utilized to make the sheet so that the sheet is more resistant to puncture. Still another approach is to utilize multiple sheets so that it is more difficult for a child to push the medicament through the retaining sheet. One major shortcoming of all of these approaches is that they are not senior friendly, i.e., as the blister card becomes more resistant to tampering by children, it becomes more difficult for the elderly or the infirm to remove the medicament when needed. This is especially important for patients with arthritis or patients who may have the use of only one hand. Accordingly, there exists a need for a blister card that is both resistant to tampering by children and that will also permit a senior to easily release the medicament from the blister card when needed.

SUMMARY OF THE INVENTION

In accordance with an exemplary embodiment of the present invention, it is an object of this invention to provide a label form for a child resistant/senior friendly blister card, comprising a first sheet having a first major surface and a second major surface and a first length and a first width defining a first area. The second major surface is provided with a permanent adhesive. A second sheet has a first major surface and a second major surface and a second length and a second width. The second length of the second sheet is less than the first length of the first sheet and the second width of the second sheet is less than the first width of the first sheet. The second length and the second width of the second sheet define a second area that is less than the first area of the first sheet. The first major surface of the second sheet is attached to the second major surface of the first sheet so that a portion of the permanent adhesive attached to the second major surface of the first sheet borders the second sheet. The second major surface of the second sheet is provided with a removable adhesive. A carrying sheet has a first major surface and a second major surface. The first major surface of the carrying sheet is provided with a non-stick surface attached to the removable adhesive on the second major surface of the second sheet and is also attached to the portion of the permanent adhesive on the second major surface of the first sheet that is not covered by the first major surface of the second sheet. A plurality of portions of the first sheet are selectively removable. The removable portions of the first sheet are disposed within the second area defined by the second length and the second width of the second sheet.

It is another object of this invention to provide a child resistant/senior friendly blister card, comprising a first sheet having a first major surface and a second major surface and a first length and a first width defining a first area. The second major surface is provided with a permanent adhesive. A second sheet has a first major surface and a second major surface and a second length and a second width. The second length of the second sheet is less than the first length of the first sheet and the second width of the second sheet is less than the first width of the first sheet. The second length and the second width of the second sheet define a second area that is less than the first area of the first sheet. The first major surface of the second sheet is attached to the second major surface of the first sheet, so that a portion of the permanent adhesive attached to the second major surface of the first sheet borders the second sheet. The second major surface of the second sheet is provided with a removable adhesive. A blister card has a plurality of medicament compartments. Each of the plurality of compartments has a closed bottom end and an open top end for receiving and dispensing a medicament. A medicament containment sheet, having a first major surface and a second major surface, has the second major surface of the containment sheet attached to the blister card. A portion of the first major surface of the containment sheet is attached to the removable adhesive on the second major surface of the second sheet and a portion of the containment sheet is attached to the portion of the permanent adhesive disposed on the second major surface of the first sheet that is not covered by the second sheet, i.e., that portion that surrounds or borders the second sheet. A plurality of portions of the first sheet are selectively removable. The removable portions of the first sheet are disposed within the second area defined by the second length and the second width of the second sheet and the removable portions of the first sheet are in registry with the open top ends of the medicament compartments.

DETAILED DESCRIPTION OF THE INVENTION

Figure 1:
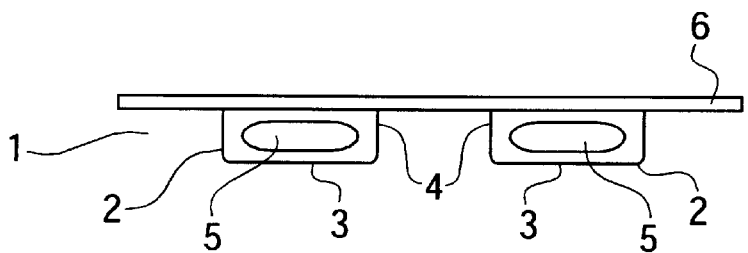
FIG. 1 shows a conventional blister card containing a medicament.
Figure 2:
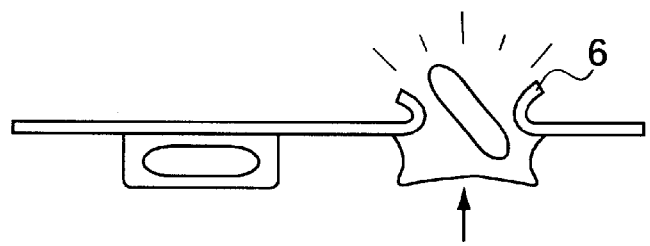
FIG. 2 shows the medicament shown in FIG. 1 being dispensed.

FIG. 1 is a side view of a conventional blister card package 1. The blister card 1 is provided with a plurality of medicament compartments, or pockets 2, having a closed bottom end 3 and an open top end 4 for receiving and storing a medicament 5. A medicament retaining sheet 6 is permanently attached to the blister card 1 and covers the open top end 4 of the medicament compartment 2 so that the medicament 5 is retained in the medicament compartment until required. When the user desires to dispense the medicament 5, the retaining sheet 6 is either cut or punctured to release the medicament 5. This is often accomplished by simply using a thumb or finger to apply pressure to the closed bottom end 3 of the medicament compartment 2 and pushing the medicament 5 through the retaining sheet 6 as shown in FIG. 2. The thickness of the retaining sheet 6 and the material utilized to make the retaining sheet 6 may be varied to vary the degree of pressure or strength required to puncture the retaining sheet.

Figure 3:
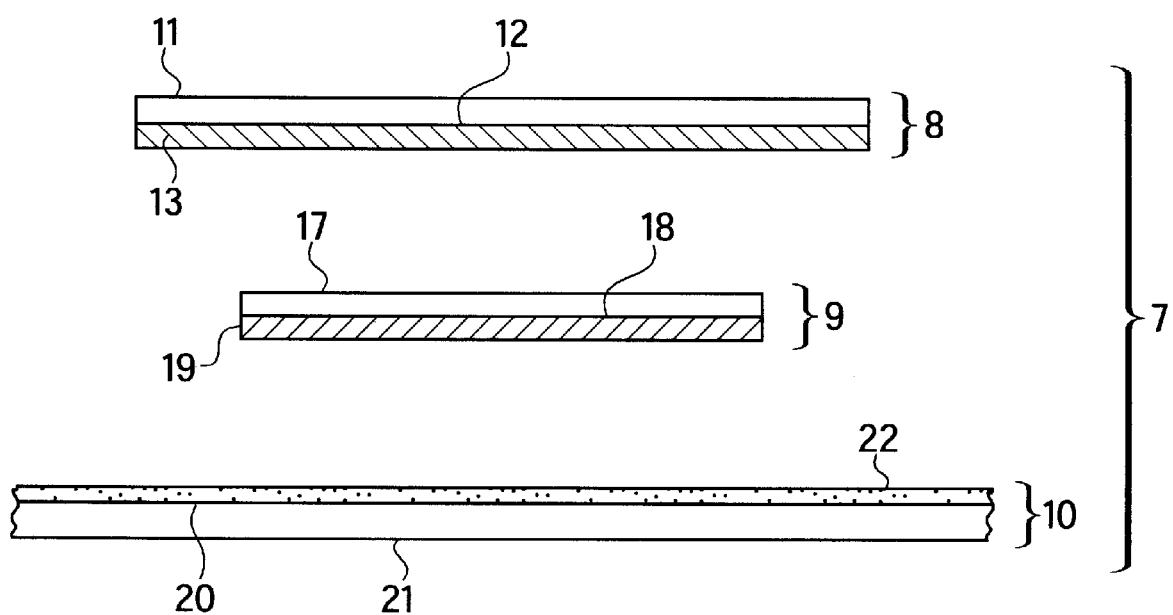
FIG. 3 is an exploded view of a label form constructed in accordance with the invention.

FIG. 3 is an exploded view of a label form 7 for a child resistant/senior friendly blister card constructed in accordance with the invention and shows a first sheet 8, a second sheet 9, and a carrying sheet 10.

Figure 4:
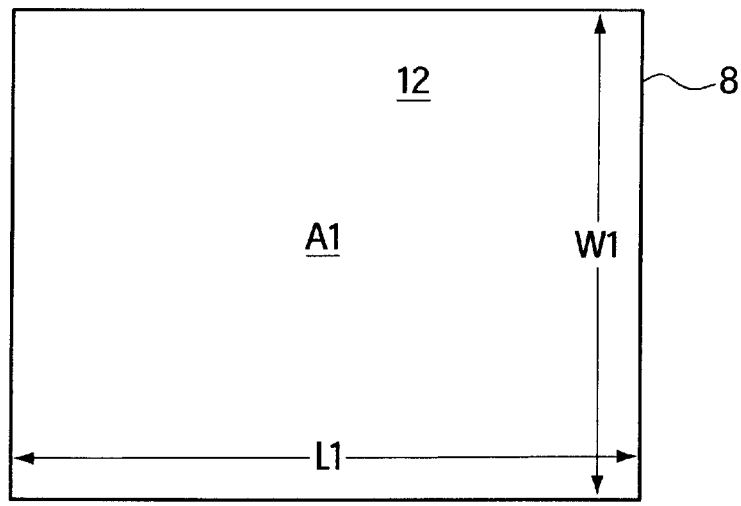
FIG. 4 shows a major surface of a first sheet constructed in accordance with the invention.
Figure 8:
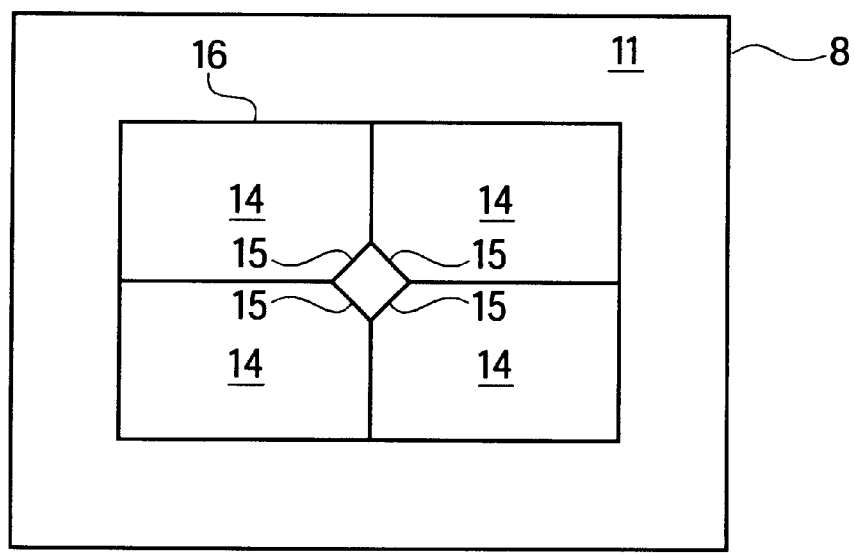
FIG. 8 shows the first major surface of a first sheet constructed in accordance with the invention.

The first sheet 8 has a first major surface 11 and a second major surface 12. The first sheet 8 is preferably comprised of paper or a synthetic material. A permanent adhesive 13 is attached to the second major surface 12 of the first sheet 8. FIG. 4 is a view of the second major surface 12 of the first sheet 8 and shows that the first sheet 8 has a first length $L_1$ and a first width $W_1$ defining a first area $A_1$. FIG. 8 shows the first major surface 11 of the first sheet 8 and shows that the first sheet 8 is provided with a plurality of removable portions 14 that are selectively removable. Facilitation notches 15 may be provided to facilitate the selective removal of the removable portions 14. Perforations, cuts, or scoring 16 may also be provided in the first sheet 8 to facilitate the removal of each of the removable portions 14.

Figure 5:
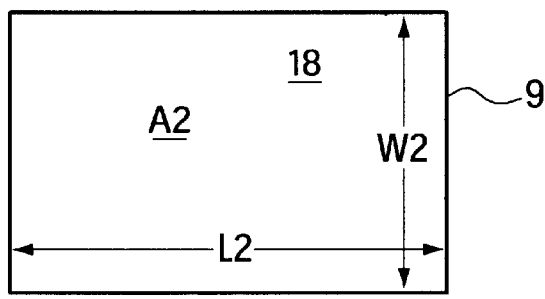
FIG. 5 shows a major surface of a second sheet constructed in accordance with the invention.

As shown in FIG. 3, the second sheet 9 has a first major surface 17 and a second major surface 18. The second sheet 9 is preferably comprised of a synthetic material. A removable or temporary adhesive 19 is applied to the second major surface 18 of the second sheet 9. FIG. 5 is a view of the second major surface 18 of the second sheet 9 and shows that the second sheet 9 has a second length $L_2$ and a second width $W_2$ defining a second area $A_2$ that is smaller than $A_1$.

As shown in FIG. 3, the carrying sheet 10 has a first major surface 20 and a second major surface 21. The first major surface 20 of the carrying sheet 10 is provided with a non-stick surface 22. In a preferred embodiment, the non-stick coating is silicone.

Figure 6:
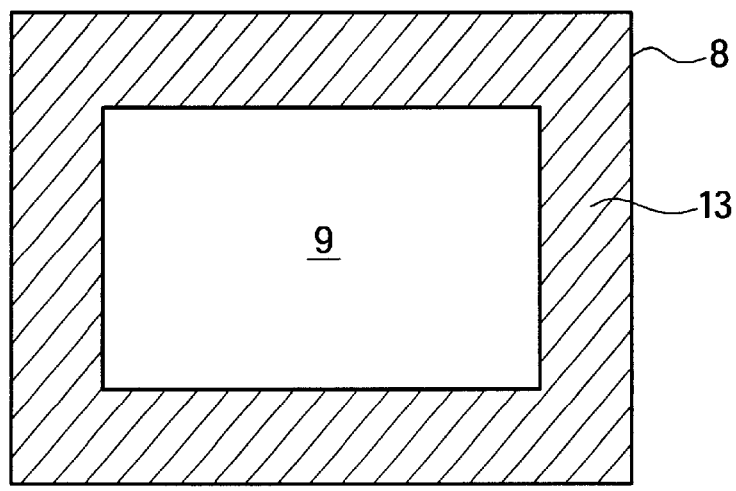
FIG. 6 shows the second sheet of FIG. 5 superimposed on the first sheet of FIG. 4.
Figure 7:
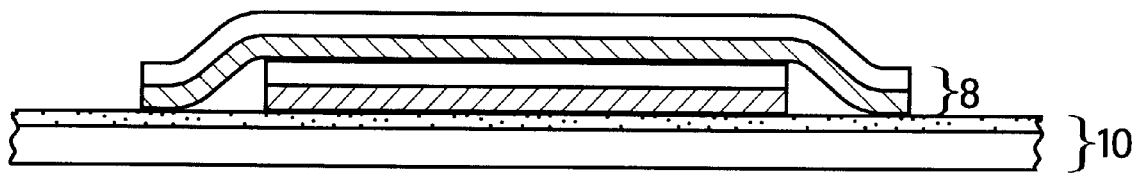
FIG. 7 shows the exploded view of the label form of FIG. 3 in the assembled configuration.

FIG. 7 shows the exploded label set of FIG. 3 as it appears when assembled. When assembled, the first major surface 17 of the second sheet 9 is attached to the permanent adhesive 13 on the second surface 12 of the first sheet 8. The removable adhesive 19 disposed on the second major surface 18 of the second sheet 9 is attached to the non-stick surface 22 disposed on the first major surface 20 of the carrying sheet 10. The second sheet 9 is disposed within $A_1$ of the first sheet 8 so that a portion of the permanent adhesive 13 on the second major surface 12 of the first sheet borders or surrounds the second sheet 9 as shown in FIG. 6. The removable portions 14 of the first sheet 8 are disposed within the second area $A_2$ defined by $L_2$ and $W_2$ of the second sheet as shown in FIG. 8.

Figure 9:
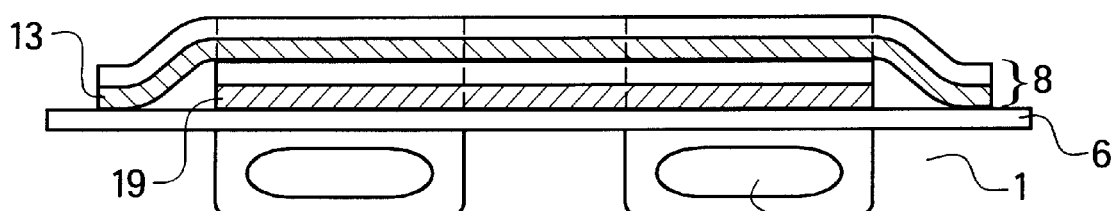
FIG. 9 shows a label form and blister card constructed in accordance with the invention.

In operation, the label form shown in FIG. 7 is removed from the carrying sheet 10 and is applied to a blister card 1 as shown in FIG. 9.

Figure 10:
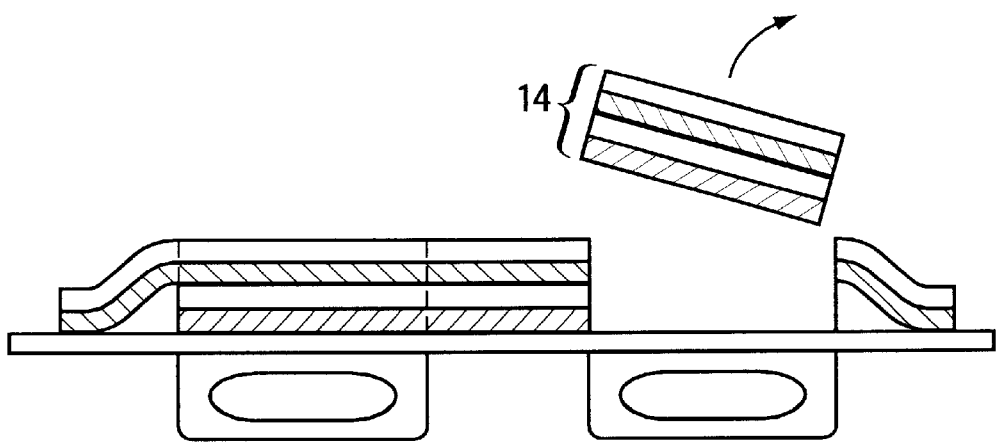
FIG. 10 shows the label form of FIG. 9 with a removable portion removed.

FIG. 9 shows a blister card 1 containing a medicament 5. The medicament 5 is held in place by a medicament retaining sheet 6. The label form is removed from the carrying sheet 10 and is attached to the medicament retaining sheet 6. The portion of the permanent adhesive 13 that surrounds the second sheet 9 permanently adheres the label form to the medicament retaining sheet 6. The removable portions 14 of the first sheet 8 are in registry with the medicament compartments 2 of the blister card 1. When the label form is applied to the blister card 1 the blister card 1 is resistant to tampering by children because the medicament retaining sheet 6, the second sheet 9, and the first sheet 8 cooperate to provide greater resistance to a child attempting to push the medicament 5 through the three layers 8, 9, and 6. Although resistant to tampering by children, the blister card 1 is also senior friendly because an adult would first remove the removable portion 14 of the first sheet 8 as shown in FIG. 10. Removing the removable portion 14 of the first sheet 8 also removes the portion of the second sheet 9 that is permanently attached to the permanent adhesive 13 on the second major surface 12 of the first sheet 8. Thus, only the medicament retaining sheet 6 prevents the medicament 5 from being removed from the medicament compartment 2 as shown in FIG. 10. The user then pushes the medicament 5 through the medicament retaining sheet 6 as shown in FIG. 11 and as previously discussed.

Figure 11:
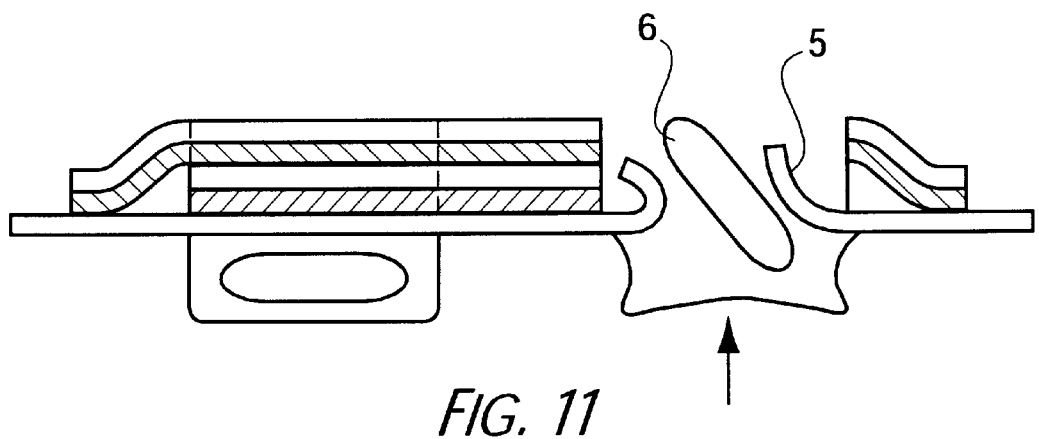
FIG. 11 shows how the medicament shown in FIG. 10 is dispensed.
Figure 12:
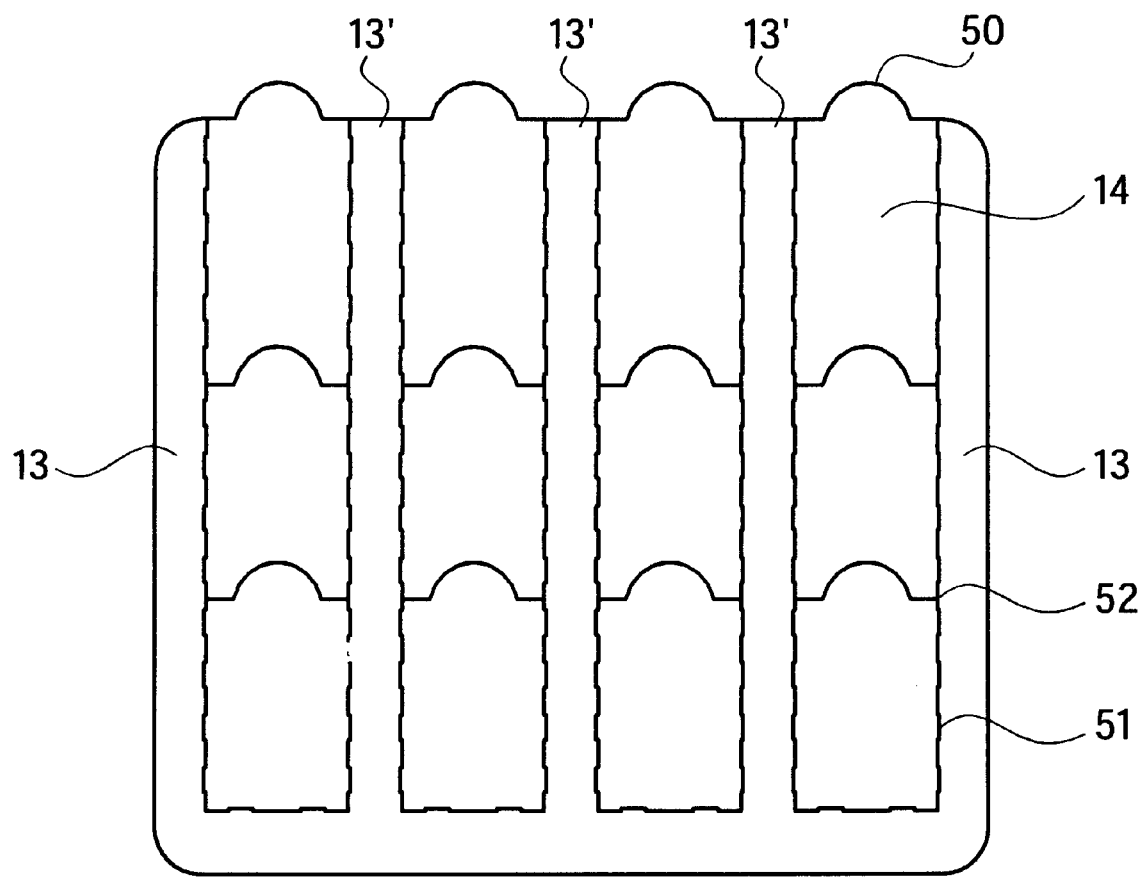
FIG. 12 is a top view of another embodiment of the invention.
Figure 13:
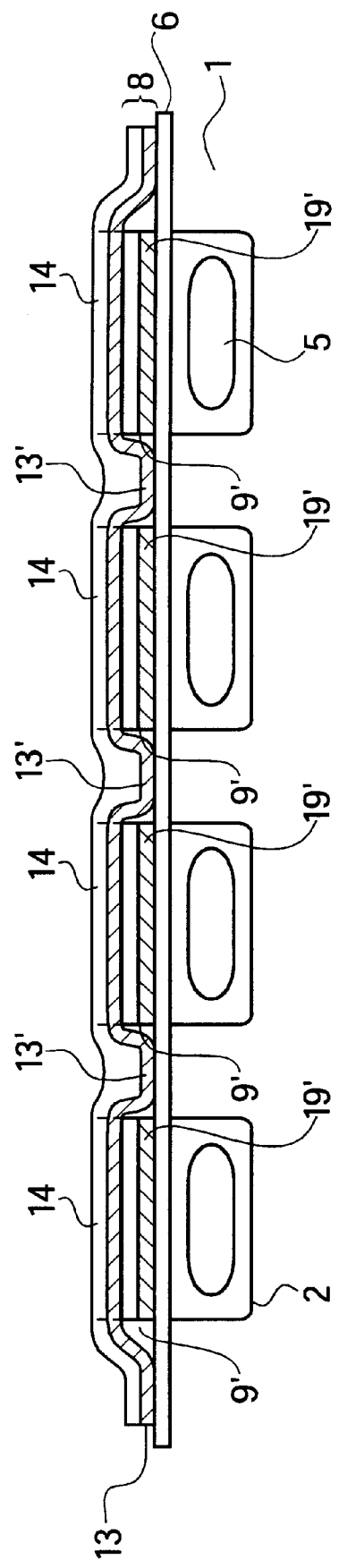
FIG. 13 is a side view of the invention shown in FIG. 12 applied to a blister card.

In the embodiment shown in FIGS. 11 and 12, the second sheet is not a continuous sheet as disclosed in FIGS. 3 to 11. Instead, a plurality of discrete second sheets 9' are disposed as discrete portions or strips. This permits the portions 13' of the permanent adhesive 13 attached to the first sheet 8, and disposed between the plurality of second sheets 9', and thus disposed between the removable portions 14 of the first sheet 8, to come in direct contact with and permanently adhere to the medicament retaining sheet 6 permanently attached to the blister card 1 as shown in FIG. 12.

The permanent adhesive 13' disposed between the second sheets 19' has the effect of isolating each removable label 14 so that pulling on the tab of each label will remove only one label at a time. In addition, in this embodiment each removable portion 14 is provided with a tab 50 to facilitate selective removal of each of the removable portions 14. Each removable portion 14 may also be provided with means, e.g., perforations 51 and/or slits 52 cut into the removable portion 14 to facilitate selective removal of each removable portion 14 and to help isolate each removable portion 14 to permit selective removal of each removable portion 14 without inadvertently removing any other removable portion 14.

FIG. 12 shows a blister card 1 containing a medicament 5. The medicament 5 is held in place by a medicament retaining sheet 6. The label form is removed from the carrying sheet 10 and is attached to the medicament retaining sheet 6. The portion of the permanent adhesive 13 that surrounds or borders the first sheet permanently adheres the border of the label form to the medicament retaining sheet 6. The removable portions 14 of the first sheet 8 are in registry with the medicament compartments 2 of the blister card 1. Each of the plurality of second sheets 9' is in registry with the removable portions 14 of the first sheet 8. When the label form is applied to the blister card 1, the blister card 1 is resistant to tampering by children because the medicament retaining sheet 6, the second sheets 9', and the first sheet 8 cooperate to provide greater resistance to a child attempting to push the medicament 5 through the three layers 8, 91, and 6. Although resistant to tampering by children, the blister card 1 is also senior friendly because an adult would first remove the removable portion 14 of the first sheet 8 as shown in FIG. 10. Removing the removable portion 14 of the first sheet 8 also removes the portions of the second sheets 9' that are permanently attached to the permanent adhesive 13 on the second major surface 12 of the first sheet 8. Thus, only the medicament retaining sheet 6 prevents the medicament 5 from being removed from the medicament compartment 2 as shown in FIG. 10 and as previously discussed. The user then pushes the medicament 5 through the medicament retaining sheet 6 as shown in FIG. 11 and as previously discussed.

What is claimed is:

1. A label form for a child resistant/senior friendly blister card, comprising:

(a) a first sheet having a first major surface and a second major surface and a first length and a first width defining a first area, the second major surface provided with a permanent adhesive;

(b) a second sheet having a first major surface and a second major surface and a second length and a second width, the second length of the second sheet less than the first length of the first sheet and the second width of the second sheet less than the first width of the first sheet, the second length and the second width defining a second area that is less than the first area, the first major surface of the second sheet attached to the second major surface of the first sheet so that a portion of the permanent adhesive attached to the second major surface of the first sheet borders the second sheet, the second major surface of the second sheet provided with a removable adhesive;

(c) a carrying sheet having a first major surface and a second major surface, the first major surface of the carrying sheet provided with a non-stick surface attached to the removable adhesive on the second major surface of the second label; and also attached to the portion of the permanent adhesive on the second major surface of the first sheet that is not covered by the first major surface of the second sheet; and (d) a plurality of portions of the first sheet selectively removable, the removable portions of the first sheet disposed within the second area defined by the second length and the second width of the second sheet.

2. The label form of claim 1, wherein the first sheet is paper.

3. The label form of claim 1, wherein the first sheet is a synthetic material.

4. The label form of claim 1, wherein the second sheet is a synthetic material.

5. The label form of claim 1, wherein the non-stick coating is silicone.

6. The label form of claim 1, further comprising removal facilitation notches to facilitate the selective removal of the removable portions of the first sheet.

7. A child resistant/senior friendly blister card, comprising:

(a) a first sheet having a first major surface and a second major surface and a first length and a first width defining a first area, the second major surface provided with a permanent adhesive;

(b) a second sheet having a first major surface and a second major surface and a second length and a second width, the second length of the second sheet less than the first length of the first sheet and the second width of the second sheet less than the first width of the first sheet, the second length and the second width defining a second area that is less than the first area, the first major surface of the second sheet attached to the second major surface of the first sheet, so that a portion of the permanent adhesive attached to the second major surface of the first sheet borders the second sheet, the second major surface of the second sheet provided with a removable adhesive;

(c) a blister card having a plurality of medicament compartments, each of the plurality of compartments having a closed bottom end and an open top end for receiving a medicament;

(d) a medicament containment sheet having a first major surface and a second major surface, the second major surface of the containment sheet attached to the blister card and a portion of the first major surface of the containment sheet attached to the removable adhesive on the second major surface of the second sheet and a portion of the containment sheet attached to the portion of the permanent adhesive disposed on the second major surface of the first sheet that is not covered by the second sheet; and (e) a plurality of portions of the first sheet selectively removable, the removable portions of the first sheet disposed within the second area defined by the second length and the second width of the second sheet, the removable portions of the first sheet in registry with the open top ends of the medicament compartments.

8. The blister card of claim 7, wherein the first sheet is paper.

9. The blister card of claim 7, wherein the first sheet is a synthetic material.

10. The blister card of claim 7, wherein the second sheet is a synthetic material.

11. The blister card of claim 7, wherein the non-stick coating is silicone.

12. The blister card of claim 7, further comprising removal facilitation notches to facilitate the selective removal of the removable portions of the first sheet.

13. The blister card of claim 7, wherein the medicament containing sheet is transparent.

14. A label form for a child resistant/senior friendly blister card, comprising:

(a) a first sheet having a first major surface and a second major surface and a first length and a first width defining a first area, the second major surface provided with a permanent adhesive;

(b) a plurality of second sheets each of said second sheets having a first major surface and a second major surface, the first major surface of each of the plurality of the second sheets attached to the second major surface of the first sheet so that a portion of the permanent adhesive attached to the second major surface of the first sheet borders the second major surface of the first sheet and so that all of the second sheets are contained within this border, the second major surface of each of the second sheets provided with a removable adhesive;

(c) a carrying sheet having a first major surface and a second major surface, the first major surface of the carrying sheet provided with a non-stick surface attached to the removable adhesive on the second major surface of the second sheet; and also attached to the portion of the permanent adhesive on the second major surface of the first sheet that is not covered by the first major surfaces of the second sheets; and (d) a plurality of portions of the first sheet selectively removable, the plurality of second sheets disposed in registry with the removable portions of the first sheet so as to leave a portion of the permanent adhesive on the second major surface of the first sheet disposed between the removable portions of the first sheet and in contact with the non-stick surface disposed on the first major surface of the carrying sheet.

15. The label form of claim 14, wherein the first sheet is paper.

16. The label form of claim 14, wherein the first sheet is a synthetic material.

17. The label form of claim 14, wherein the second sheet is a synthetic material.

18. The label form of claim 14, wherein the non-stick coating is silicone.

19. The label form of claim 14, further comprising removal facilitation notches to facilitate the selective removal of the removable portions of the first sheet.

20. A child resistant/senior friendly blister card, comprising:

(a) a first sheet having a first major surface and a second major surface and a first length and a first width defining a first area, the second major surface provided with a permanent adhesive;

(b) a second sheet having a first major surface and a second major surface, the first major surface of the second sheet attached to the second major surface of the first sheet, so that a portion of the permanent adhesive attached to the second major surface of the first sheet borders the second major surface of the first sheet and so that all of the second sheets are contained within the border, the second major surface of each of the second sheets provided with a removable adhesive;

(c) a blister card having a plurality of medicament compartments, each of the plurality of compartments having a closed bottom end and an open top end for receiving a medicament;

(d) a medicament containment sheet having a first major surface and a second major surface, the second major surface of the containment sheet attached to the blister card and a portion of the first major surface of the containment sheet attached to the removable adhesive on the second major surfaces of each of the second sheets and a portion of the containment sheet attached to the portion of the permanent adhesive disposed on the second major surface of the first sheet that is not covered by the second sheets; and (e) a plurality of portions of the first sheet selectively removable, the removable portions of the first sheet in registry with the open top ends of the medicament compartments, each of the plurality of second sheets disposed in registry with the removable portions of the first sheet so as to leave a portion of the permanent adhesive on the second major surface of the first sheet disposed between the removable portions of the first sheet and in contact with the first major surface of the medicament containment sheet.

21. The blister card of claim 20, wherein the first sheet is paper.

22. The blister card of claim 20, wherein the first sheet is a synthetic material.

23. The blister card of claim 20, wherein the second sheet is a synthetic material.

24. The blister card of claim 20, wherein the non-stick coating is silicone.

25. The blister card of claim 20, further comprising removal facilitation notches to facilitate the selective removal of the removable portions of the first sheet.

26. The blister card of claim 20, wherein the medicament containing sheet is transparent.

27. The label form of claim 14, further comprising a tab attached to each removable portion.

28. The label form of claim 27, further comprising means to facilitate selective removal of the removable portions.

29. The label form of claim 27, wherein the means is selected from the group consisting of slits and perforations.

30. The blister card of claim 20, further comprising a tab attached to each removable portion.

31. The blister card of claim 30, further comprising means to facilitate selective removal of the removable portions.

32. The blister card of claim 30, wherein the means is selected from the group consisting of slits and perforations.

* * * * *

UNITED STATES PATENT AND TRADEMARK OFFICE
CERTIFICATE OF CORRECTION

PATENT NO. : 6,357,593 B1  Page 1 of 1
DATED : March 19, 2002
INVENTOR(S) : Bolnick M. Martin It is certified that error appears in the above-identified patent and that said Letters Patent is hereby corrected as shown below:

Column 54,
Line 63, change "8, 91, and" to -- 8, 9', and --.

Signed and Sealed this

Nineteenth Day of November, 2002

Attest:

Attesting Officer

JAMES E. ROGAN
Director of the United States Patent and Trademark Office